Nov. 11, 1941.   W. C. HOCH   2,262,534
LENS SYSTEM
Filed March 4, 1939
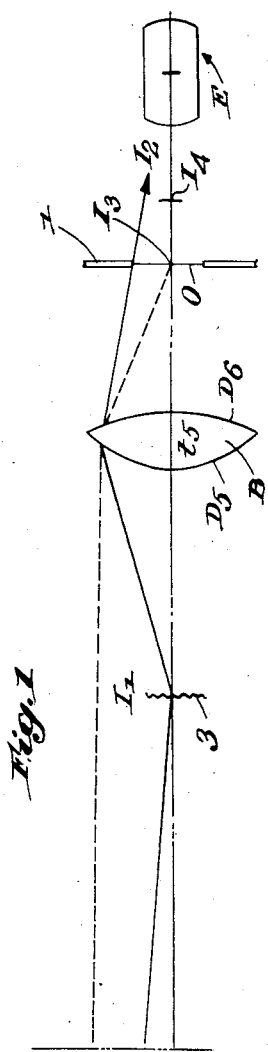
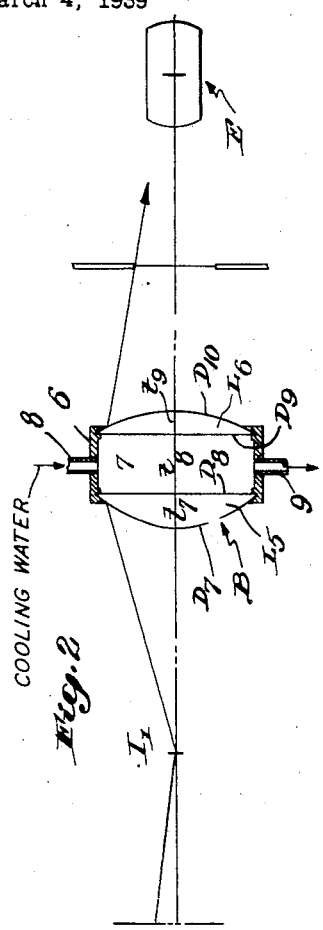
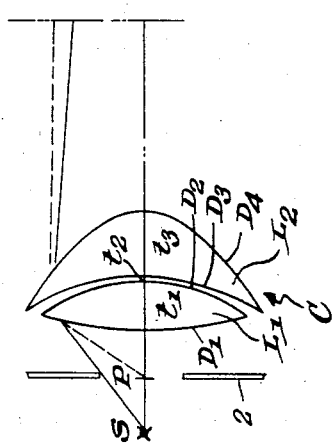
Inventor
Winton C. Hoch
by Roberts, Cushman & Woolbury
Attys.

Patented Nov. 11, 1941

2,262,534

UNITED STATES PATENT OFFICE 2,262,534

LENS SYSTEM

Winton C. Hoch, Los Angeles, Calif., assignor to Technicolor Motion Picture Corporation, Hollywood, (Los Angeles), California, a corporation of Maine Application March 4, 1939, Serial No. 259,848

2 Claims. (Cl. 88—57)

The present invention deals with optical systems, especially with lens systems for use in projecting apparatus.

Some of the objects of the invention are to provide a lens system for illuminating a transparent object to be projected which, with a minimum of lens surfaces, furnishes an optimum amount of illumination uniformly distributed over the image area, and fairly completely illuminates a large aperture projecting lens. Other objects are to provide such a system which is especially suitable for projecting motion picture film at very high illumination intensities, which avoids undesirable influence of the condition of certain lens faces, which permits elimination of heat energy by inserting heat absorbing instrumentalities at points where they are harmless in other respects, and which permits convenient control of the light output at any desired part of the image area.

One of the principal features of the invention is the enlarged imaging of the light source at considerable distance from the light source, the image of the source being further imaged into the projecting system by a single field lens unit; this arrangement locates the elements of the system and their respective images in a manner especially favorable for purposes of high intensity projection. Another important feature is the aspheric formation of the field lens, which provides very uniform illumination of the field, especially if the first image of the light source is produced with a lens of similar character.

These and other objects and features will be apparent from the following description illustrating the genus of the invention by explaining several practical embodiments thereof. The description refers to a drawing in which:

Fig. 1 is a diagram showing a projector incorporating a lens system according to the invention; and Fig. 2 is a similar diagram showing part of an embodiment incorporating a water cooled field lens unit.

In Fig. 1, a light source is indicated at S; this source may, for example, be a high intensity carbon arc. A condenser lens unit C is arranged comparatively close to the source and is preferably a collective doublet consisting of elements $L_1$ and $L_2$, element $L_2$ being meniscus shaped and preferably having a parabolic rear surface $D_4$. At a distance from the condenser unit, of about six to eight times the axial equivalent focal length of the condenser unit, is arranged a field lens unit B having a parabolic front surface $D_5$. Beyond the rear surface $D_6$ is arranged the picture window indicated at 1, with the projection object, and therebeyond a standard projecting system E.

The following dimensions have been found suitable for an arrangement of this type, the curvatures and distances being given in diopters and mm., respectively:

| | |
|---|---:|
| Distance S to $D_1$ | 82 |
| Condenser unit C: | |
|     Diameter of $L_1$ | 160 |
|     Diameter of $L_2$ | 185 |
|     $D_1$ | 0.70 |
|     $t_1$ | 33 |
|     $D_2$ | 4.00 |
|     $t_2$ | 1.50 |
|     $D_3$ | −1.00 |
|     $t_3$ | 55 |
|     $D_4$ axis | 7.00 |
|     $D_4$ periphery | 1.75 |
| Distance $D_4$ to $D_5$ | 865 |
| Field unit B: | |
|     Diameter of B | 135 |
|     $D_5$ axis | 7.25 |
|     $D_5$ periphery | 3.50 |
|     $t_5$ | 41 |
|     $D_6$ | 1.75 |
| Distance $D_6$ to picture window | 112 |

An illumination system of this type gathers a considerable light cone, in the present instance 85° to 90°, due to the comparatively large diameter of the condenser unit and the short distance of the latter from the light source. The condenser unit being meniscus shaped, its principal points are displaced towards its rear surface $D_4$; for axial rays, the first principal point is about 35 mm. from the $D_4$, the second principal point 15 mm., and the equivocal focal length is about 105 mm. Due to these conditions, the light source is imaged at a considerable distance from the condenser unit, namely at $I_1$ which is about 680 mm. from $D_4$.

The field lens unit B, having an axial equivalent focal length of about 120 mm., is arranged at a distance of about 180 mm. from image plane $I_1$ and directs a light beam through picture window 1 with projection object 0, into the pupil of projecting system E. With the optical relations given, the window is well illuminated by avoiding waste of light and the aperture of a projecting lens of f:1.6 is filled by the light cone forming the second image $I_2$ of the source.

A plane P, about half way between the light source and the first condenser unit face $D_1$, is imaged by C and B at the picture window as indicated in Fig. 1; this fact can be utilized by placing, if desired, a matte or a mask 2 of film window proportions in plane P, which will be imaged at the film window in plane I₃, shielding the film movement from radiant energy not needed for projection purposes, thereby counteracting the heating of the film before it is stopped in the window.

The front face of condenser unit C is imaged at a plane I₄ between the picture window and lens system E; this condition prevents the undesirable projection of condenser face D on the screen, and any particles likely to be splashed against this face will not disturb the projected film image.

The considerable distance of unit B from the picture window is advantageous, as compared with the aperture lens arrangements of so-called relay condenser systems which are so close to the window that they can not be easily ventilated and kept clean.

$I_1$ being the image of the pupil of lens system E, a light absorbing element, for example a metal gauze 3 can be placed at that point, for the purpose of reducing the illumination intensity without in any way affecting the field or necessitating a decrease of the light source amperage. There is indeed an extended area between $D_4$ and $I_1$ which can be used for vignetting purposes, for example for reducing the light intensity on the center of the projection screen by means of a matte.

The use of aspheric surfaces at C and B provides particularly even screen illumination; according to actual measurements, the screen corners receive only about 5% less light than the center.

A modification of the invention is shown in Fig. 2, where the field lens B is employed for cooling purposes. As indicated, two plano convex lenses $L_5$ and $L_6$ are used with the plano faces forming with mounting 6, a water cell 7, which may be connected to a radiator (not shown) by means of ducts 8 and 9; thermosyphonic water circulation was found sufficient in this arrangement which makes any other cooling provision unnecessary.

The dimensions of this system, as far as varying from that of Fig. 1, are as follows:

| | |
|---|---:|
| Distance $D_4$—$D_5$ | 865 |
| Field unit B: | |
| Diameter of B | 135 |
| $D_7$ axis | 7.25 |
| $D_7$ periphery | 3.50 |
| $t_7$ | 35 |
| $D_8$ | 0 |
| $t_8$ | 50 |
| $D_9$ | 0 |
| $t_9$ | 9 |
| $D_{10}$ | 2.25 |
| Distance $D_{10}$ to picture window | 80 |
| Distance to nodal point of E | 260 |

It will be noted that the field lens unit lends itself especially well for use as a water cell since, in contradistinction to the condenser unit, it can be biconvex and therefore be easily split; also, being comfortably separated from the picture window, its cooling equipment can be arranged without crowding.

It will be understood that the above described elements are suitably mounted essentially as in conventional projection apparatus; since the invention is primarily concerned with the optical system, it is believed unnecessary to show such apparatus.

It should be understood that the present disclosure is for the purpose of illustration only and that this invention includes all modifications and equivalents which fall within the scope of the appended claims.

I claim:

1. An optical system for directing light through a projection object into the projection lens of a projector, comprising a light source, a collective condenser lens unit, masking means placed approximately midway between said source and the first surface of said condenser unit, and a collective field lens unit in alignment between said source and said projection lens beyond said object, said condenser unit being spaced between said source and said object and having curvatures imaging the source towards the object at a distance of at least five times the distance between the source and the condenser unit, said field unit being placed beyond said image at a distance greater than its focal length and having curvatures projecting the image through said object into said projection lens, and together with said condenser unit imaging said masking means substantially at said object and said first surface beyond said object.

2. An optical system for directing light through a projection object into the projection lens of a projector, comprising a light source, a collective condenser lens unit and a collective field lens unit in alignment between said source and said projection lens beyond said object, said condenser unit being spaced between said source and said object to image the source towards the object in air at a distance greater than the distance between the source and the condenser unit, said field unit having two spaced lens components mounted in means for confining a cooling agent between said components, and being placed beyond said image at a distance greater than its focal length to project the image through said object into said projection lens.

WINTON C. HOCH.